US 6,576,173 B1

(12) United States Patent
Koppe et al.

(10) Patent No.: US 6,576,173 B1
(45) Date of Patent: Jun. 10, 2003

(54) METHOD FOR MANUFACTURING A PORCELAIN BODY IN A DESIRED SHAPE

(75) Inventors: Franz Koppe, Eschenbach (DE); Gerald Weber, Ansbach (DE)

(73) Assignee: Carl Freudenberg, Weinheim (DE)

( * ) Notice: Subject to any disclaimer, the term of this patent is extended or adjusted under 35 U.S.C. 154(b) by 0 days.

(21) Appl. No.: 09/643,442

(22) Filed: Aug. 22, 2000

(30) Foreign Application Priority Data

Aug. 26, 1999 (DE) .......................... 199 40 653

(51) Int. Cl.⁷ .............. B28B 3/20; B28B 1/14; B29C 65/00
(52) U.S. Cl. .......... 264/44; 264/638; 264/642; 264/650; 156/89.11
(58) Field of Search ............... 264/642, 650, 264/638, 44, 43; 156/89.11

(56) References Cited

U.S. PATENT DOCUMENTS

| 5,614,448 A | * | 3/1997 | Kreiner | ............ 501/32 |
| 6,054,506 A | * | 4/2000 | Huggins | ............ 523/200 |
| 6,348,425 B1 | * | 2/2002 | Barattini et al. | ............ 501/5 |

FOREIGN PATENT DOCUMENTS

| DE | 3786019 | 5/1991 |
| DE | 4233518 | 10/1992 |
| DE | 19615400 | 10/1997 |
| EP | 0635464 | 1/1995 |
| EP | 0650946 | 5/1995 |

* cited by examiner

*Primary Examiner*—Christopher A. Fiorilla
(74) *Attorney, Agent, or Firm*—Milde & Hoffberg, LLP

(57) ABSTRACT

An improved method for manufacturing a porcelain object in a desired shape, from a mixture of at least clay, feldspar and quartz. According to the method, an aqueous dispersion of vinyl acetate and ethylene based copolymer is added to the mixture, and the mixture transformed into an aqueous mass in the shape of a foil with a thickness of 50 $\mu$m to 3 mm and dried. The dried foil is then formed into a desired object shape, and permanently hardened by a ceramic firing process. The dried foil may be brought into the desired object shape by known processes such as rolling, laminating, calendering, cutting, punching, paper folding methods and deep drawing. Once brought into the desired object shape, no drying is required before ceramic firing.

19 Claims, No Drawings

METHOD FOR MANUFACTURING A PORCELAIN BODY IN A DESIRED SHAPE

BACKGROUND OF THE INVENTION

The invention relates to a method for manufacturing a porcelain object, where a mixture of at least clay, feldspar and quartz is transformed into the shape of an aqueous mass and then formed into a final shape and permanently hardened by a firing process.

Ceramic materials are used to manufacture objects that feature a high thermal and chemical resistance. Their insulating properties against electrical currents are also of interest. With known methods for manufacturing ceramic objects, preferably an aqueous casting slip is made from the ceramic mass, formed into the shape of a so-called green product and subsequently dried. Through a ceramic firing process, a green product is subsequently turned into a so-called white product. White products exhibit a high strength. Depending on the composition of the ceramic mass, the white products may find applications as tableware, high performance ceramics for cutting purposes, spinnerets, filters, and gaskets or in the electrotechnical field. The application of the method is costly.

Ceramic masses that contain an aqueous dispersion of a polymeric binding agent are known from the German Patent No. DE-A 196 154 00, the European Patent Nos. EP-A 6 354 64 and EP-A 650 946 and the Japanese Patent No. JP-A 60/10956. The manufacture of the ceramic mass is then accomplished by adding the aqueous dispersion of a polymeric binding agent, and possibly other auxiliary materials such as dispersing agents, de-foamers and softeners that improve the casting ability and the flexibility of the mass, to the aqueous suspension of a ceramic powder. The percentage of the ceramic in the dispersion is between 30 and 85 percent in weight depending on the field of application and the desired properties of the ceramic object.

To manufacture a so-called green foil, the prescribed mass is cast in an as consistent thickness as possible through a defined casting gap onto a continuous band and subsequently guided through a drying tunnel. In this manner, the dispersion is thickened and dried to the point where at the end of the drying tunnel only the ceramic powder with the polymer and the possibly added auxiliary materials remain. Thus, a flexible polymer foil is obtained that exhibits a very high filling degree of ceramic powder and that can be subjected to additional shaping processes.

One problem with the currently known ceramic foils is that the resultant ceramic foils exhibit a high degree of stiffness and are, therefore, significantly limited in their processing capabilities. Thus far, green foils are used only for the manufacture of one-layer or multi-layer objects.

SUMMARY OF THE INVENTION

The principal objective of the present invention is to provide an efficient method for manufacturing a porcelain object.

It is a further objective to provide a material composition for the use in the aforementioned method.

In the scope of the following description, a foil or a green foil always refers to a not yet fired, still shapeable foil of ceramic materials.

These objectives, as other objectives which will become apparent from the discussion that follows, are achieved, according to the present invention, by adding an aqueous dispersion of copolymer on the basis of vinyl acetate and ethylene to a mixture consisting of an aqueous dispersion of porcelain mass, which contains at least clay, feldspar and quartz, and transforming the mixture into the shape of a foil with a thickness of 50 $\mu$m to 3 mm. This foil is subsequently pre-solidified by drying and then brought into the desired shaped by shaping process such as rolling, laminating, calendering, cutting, punching, paper folding methods and/or deep-drawing and then permanently solidified through a ceramic firing process. In this manner, the object with the final shape does not need to be dried prior to the firing process. This is a great advantage for an efficient work process.

Surprisingly, it has been found that the foils made by the method and from the mixture according to the invention can be transformed into the shape of ceramic objects with a complicated shape by efficient production methods such as paper folding methods and/or deep drawing. In addition, shaping of the objects is significantly simpler than with the casting process that was used until now. No casting molds or drying processes after shaping the objects are required. Undercuts or small wall thicknesses can be produced without many problems. Additionally, it is possible to store the foils or to transport them to additional processing steps.

The foils can be made by casting, by using a doctor blade or by extrusion. They can have a uniform layer thickness or feature surface structuring, which improves application capabilities.

Furthermore, it is possible to combine the foil after its formation as a laminate with other materials that have a similar coefficient of expansion.

The resultant foils are resistant to cracking, pore-formation and are stable in their shape and make processing into a three-dimensional object easier.

The purely water-based dispersion enables environmentally friendly manufacturing processes of the foil without special expenditures for a drying and firing process. Generally, the use of additional dispersing agents is not required.

However, the composition or mixture according to the invention can be modified in many ways. For example, the flexibility of the foil can be modified by adding up to 15 percent by weight of a polymeric softener such as dibutyl phthalate or diethylene glycol, which improves the processing capability for folding, embossing and other shaping processes.

Special additives, for example, ceramic oxides such as tungsten oxide or zirconium oxide can improve the electrical properties. The content may be up to 10 percent by weight with an average grain size of 1 to 10 mm.

With additives, other properties such as flexibility can be modified.

In a known manner, the resultant ceramic objects can be glazed or decorated as well as subjected to processes common in the porcelain industry in such a way that shiny waterproof products with colorful designs can be achieved.

The method according to the invention allows for the manufacture of thin-walled objects where the appearance and, in particular, the opacity of the surface can be further improved and provided with a pattern by embossing.

Basically, the mixture for manufacturing the foil has a composition that contains 30 to 70 percent by weight of clay, 15 to 70 percent by weight of feldspar, 10 to 40 percent by weight of quartz and 3 to 30 percent by weight of an aqueous dispersion of copolymerized vinyl acetate and ethylene as well as possibly additional additives. The mixture is available inexpensively.

Additional properties, especially electrical, thermal and mechanical properties can be achieved with a content of up to 10 percent by weight of a ceramic oxide with an average grain size of 1 to 10 mm.

The adjustment of the viscosity required for making the foil from the mass is best achieved through the addition of up to 8 percent by weight of a liquefier, for example a liquefier on the basis of an aqueous sodium carbonate solution.

Through a content of a pore builder in the form of extractable salts or of substances that are volatile during the firing process such as carbonates or organic substances, defined porous structures can be created in the finished product, for example, such as are required for filters. Such objects are particularly suited as soot filters in connection with diesel engines.

A particularly advantageous composition that has excellent processing abilities contains 5 to 25 percent by weight of an aqueous dispersion of a copolymer on the basis of vinyl acetate and ethylene, 3 to 6 percent by weight of a liquefier on the basis of an aqueous sodium carbonate solution and up to 10 percent by weight of a ceramic oxide.

In the following, two exemplary embodiments describe the invention in greater detail:

EXAMPLE 1

Added to a porcelain slip with 73 percent by weight of solid matter in an aqueous dispersion are, based on the solid matter content in the porcelain slip, 12 percent by weight of a binding agent dispersion of 55 percent by weight on the basis of vinyl acetate and ethylene and 3.8 percent by weight based on the binding agent of a 10 percent by weight sodium carbonate solution as liquefier. The substances are mixed intensively and shaped into a foil using a gap casting process. The foil resulting after the drying process exhibits no cracks, no delamination, a smooth surface and good flexibility. The foil can be processed using deep drawing methods and has a shrinkage of about 14.5% after a firing process at about 1500 1C.

EXAMPLE 2

Added to a porcelain slip according to Example 1 are, based on the solid matter content in the porcelain slip, 13 percent by weight of the binding agent used in Example 1. The content of the liquefier in relation to the binding agent is 5 percent by weight. The resultant ceramic mass exhibits a viscosity that is advantageous for a casting process. The green foil obtained after the drying process is free of cracks, exhibits no delamination, has a smooth surface and has a flexibility that is suitable for further processing using a paper folding method.

There has thus been shown and described a novel method for manufacturing a porcelain object, and a composition for use in the method, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for manufacturing a porcelain object, wherein a mixture of at least clay, feldspar and quartz is transformed into the shape of an aqueous mass and then formed into a final shape and permanently hardened by a firing process, said method comprising the steps of:
    adding to the mixture an aqueous dispersion of copolymerized vinyl acetate and ethylene;
    transforming the mixture into the shape of a foil with a thickness of 50 $\mu$m to 3 mm;
    pre-solidifying the mixture by drying and then bringing the mixture into the desired object shape by means of known shaping processes; and
    permanently solidifying the shaped object through a ceramic firing process.

2. Method as set forth in claim 1, wherein the foil is formed by casting.

3. Method as set forth in claim 1, wherein the foil is formed by a doctor blade.

4. Method as set forth in claim 1, wherein the foil is formed by extrusion.

5. Method as set forth in claim 1, further comprising the step of combining the foil, after it is created, with at least one other material that has a similar coefficient of expansion to form a laminate, and thereafter solidifying and at the same time bonding the foil in the laminate.

6. Method as set forth in claim 5, wherein said other material is selected from the group consisting of glass and ceramic.

7. Method as set forth in claim 1, wherein the mixture comprises 30 to 70 percent by weight of clay, 15 to 70 percent by weight of feldspar, 10 to 40 percent by weight of quartz and 3 to 30 percent by weight of an aqueous dispersion of a copolymerized vinyl acetate and ethylene.

8. Method as set forth in claim 7, wherein the mixture further comprises additional additives.

9. Method as set forth in claim 7, wherein the mixture further comprises up to 15 percent by weight of a polymeric softener.

10. Method as set forth in claim 9, wherein the softener is selected from the group consisting of dibutyl phthalate and diethylene glycol.

11. Method as set forth in claim 7, wherein the mixture further comprises up to 10 percent by weight of a ceramic oxide with an average grain size of 1 to 10 $\mu$m.

12. Method as set forth in claim 7, wherein the mixture further comprises up to 8 percent by weight of a liquefier.

13. Method as in claim 7, wherein the mixture comprises a liquefier comprising an sodium carbonate solution.

14. Method as set forth in claim 7, wherein the mixture further comprises a pore builder in the form of extractable salts.

15. Method as set forth in claim 7, wherein the mixture further comprises a pore builder in the form of substances that are volatile during the firing process.

16. Method as set forth in claim 15, wherein the substances are selected from the group consisting of carbonates and organic substances.

17. Method as set forth in claim 7, wherein the mixture further comprises 5 to 85 percent by weight of an aqueous dispersion of copolymerized vinyl acetate and ethylene, 5 to 6 percent by weight of liquefier comprising a sodium carbonate solution and up to 10 percent by weight of a ceramic oxide.

18. Method as set forth in claim 1, wherein the known shaping process comprises the paper folding method.

19. Method as set forth in claim 1, wherein the known shaping process comprises the deep drawing method.

* * * * *